(12) United States Patent
Kim et al.

(10) Patent No.: US 7,075,544 B2
(45) Date of Patent: Jul. 11, 2006

(54) APPARATUS AND METHOD OF PROCESSING IMAGE IN THIN-CLIENT ENVIRONMENT AND APPARATUS AND METHOD OF RECEIVING THE PROCESSED IMAGE

(75) Inventors: Yong-jae Kim, Suwon-si (KR); Young-hun Choi, Suwon-si (KR); Hyun-suk Kim, Suwon-si (KR); Young-nam Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 10/390,761

(22) Filed: Mar. 19, 2003

(65) Prior Publication Data
US 2003/0187959 A1    Oct. 2, 2003

(30) Foreign Application Priority Data
Mar. 26, 2002    (KR) ............................... 2002-16472

(51) Int. Cl.
*G06F 12/02* (2006.01)
*G06F 15/16* (2006.01)

(52) U.S. Cl. ........................ 345/543; 709/201; 709/203
(58) Field of Classification Search ................ 345/543, 345/530, 544, 545; 709/201, 203, 213, 215, 709/217, 219, 230, 231; 711/100, 170, 173
See application file for complete search history.

(56) References Cited

U.S. PATENT DOCUMENTS

| | | | |
|---|---|---|---|
| 5,900,885 A * | 5/1999 | Stortz | 345/537 |
| 5,936,641 A | 8/1999 | Jain et al. | |
| 5,949,411 A * | 9/1999 | Doerr et al. | 715/716 |
| 6,748,508 B1 * | 6/2004 | Khandelwal et al. | 711/170 |
| 2002/0063792 A1 * | 5/2002 | Speed et al. | 348/416.1 |
| 2002/0178278 A1 * | 11/2002 | Ducharme | 709/231 |
| 2003/0046432 A1 * | 3/2003 | Coleman et al. | 709/247 |

OTHER PUBLICATIONS

Winner, S.; Kelley, M.; Pease, B.; Rivard, B.; Yen, A. Hardware Accelerated Rendering Of Antialiasing Using a Modified A-buffer Algorithm. Proceedings of the 24th Annual Conference on Computer Graphics and Interactive Techniques. Aug. 1997.*

(Continued)

*Primary Examiner*—Ulka Chauhan
*Assistant Examiner*—Joni Hsu
(74) *Attorney, Agent, or Firm*—Staas & Halsey LLP (57) ABSTRACT

A thin client/server network image processing system has a communication network, a thin client system, and a server, which performs a predetermined application at the request of the thin client system according to a thin client/server network environment/architecture (thin server) and transmits a result of performing the application to the thin client system through the communication network. The thin server has an image processor hardware, which accelerates rendering of a graphic signal to be processed at the request of the thin client system and encodes the rendered graphic signal and video signals linked to the graphic signal.

7 Claims, 5 Drawing Sheets

OTHER PUBLICATIONS

Webopedia Computer Dictionary. Jupitermedia Corporation. 2004. http://webopedia.internet.com/TERM/t/thin_client.html.*

Tani, M.; Yamaashi, K.; Tanikoshi, K.; Futakawa, M.; Tanifuji, S. Object-Oriented Video: Interaction with Real-World Objects Through Live Video. Proceedings of the SIGCHI Conference on Human Factors in Computing Systems. May 3-7, 1992.*

"Graphics Accelerator." http://www.webopedia.com/TERM/G/graphics_accelerator.html.*

* cited by examiner

APPARATUS AND METHOD OF PROCESSING IMAGE IN THIN-CLIENT ENVIRONMENT AND APPARATUS AND METHOD OF RECEIVING THE PROCESSED IMAGE

CROSS-REFERENCE TO RELATED APPLICATIONS

This application claims the benefit of Korean Patent Application No. 2002-16472, filed on Mar. 26, 2002, in the Korean Intellectual Property Office, the disclosure of which is incorporated herein in its entirety by reference.

BACKGROUND OF THE INVENTION

1. Field of the Invention

The present invention relates to an apparatus and method of processing an image in a thin-client (TC) environment and an apparatus and method of receiving the processed image.

2. Description of the Related Art

An international market research institute announced that the computing environment centered on personal computers (PCs) would change to be centered on non-PC appliances, i.e., information appliances, by 2004. It is estimated that the number of information terminals will increase from 10 million to 47 million within 3 years. The computing environment has followed the trend of conforming to a TC. A TC is a new concept of information terminal that is light and thin and is expected to replace the large and heavy PCs now occupying working space in an office. The size of a TC is small, yet does not bring discomfort to a user when using the keyboard, and the shape of a TC varies according to manufacturers.

TC computing changes the fundamental operating mode of a PC as well as the appearance of a PC. TC computing is referred to as "server-based computing," in which "server-based" means that all appliances are deposited in a server computer (a server) as money is deposited in a bank. Accordingly, client computers (clients) do not need a large memory or information storage (e.g., hard disc capacity). Clients only need to access a server via a network when they need programs. In this situation, clients do not download the software from the server, but instead the server executes the program, and clients receive only a display value.

Figure 1:
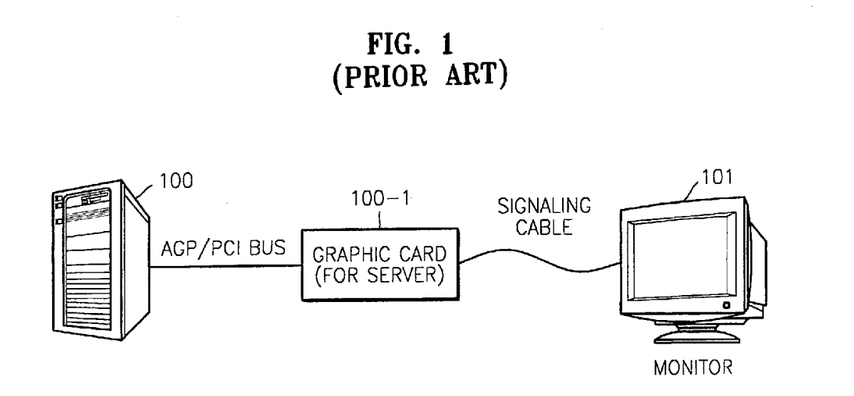
FIG. 1 is a block diagram of a conventional computer processing an image.

FIG. 1 is a block diagram of a general computer system processing an image, which includes a PC 100, which can also be designated as a server depending on application, a graphic card 100-1 provided within the PC 100, and a monitor 101. Generally, the PC or server 100 uses the graphic card 100-1 for a local user's or administrator's graphic processing. When a picture is drawn using graphics (i.e., an image is to be displayed on the monitor 101), such display images are rendered to an independent frame buffer (not shown) within the graphic card 100-1 by a graphic engine (not shown) within the graphic card 100-1 and are then periodically read from the frame buffer to be transmitted to the monitor 101.

Figure 2:
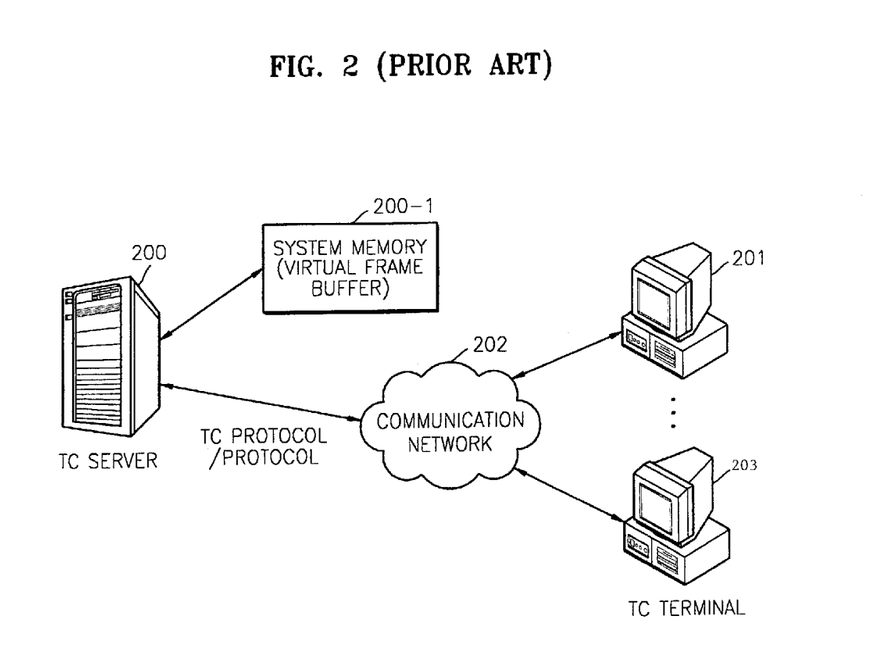
FIG. 2 is a block diagram of a conventional client/server network system processing an image according to a thin-client (TC) environment.

FIG. 2 is a block diagram of a conventional system processing an image according to a TC environment. The conventional apparatus includes a TC server 200, a system memory 200-1 provided within the TC server 200, a TC terminal 201, and a communication network 202. In FIG. 2, a graphic card (not shown) for local users or administrators exists in each server 200 and clients 201, but a special graphic card for remote TC 203 users does not exist. Accordingly, the system memory 200-1 is used as a virtual frame buffer. Since the TC server 200 does not have a hardware-based graphic accelerator for the TC terminal 203, direct image rendering to the system memory 200-1 is performed via software. A rendered signal is then encoded and is then transmitted to the TC terminal 203 through the communication network 202 using a TC protocol or other known protocols.

Since the TC server 200 maintains the virtual frame buffer in the system memory 200-1 for TC users and renders a graphic signal via software, more TC server 200 resources are used as the number of TC users increases. In particular, when a moving picture is reproduced, the consumption of resources by the TC server 200 rapidly increases because the TC server 200 requires high computing power when decoding, scaling, filtering, and transforming color coordinates with respect to the moving picture via software. Accordingly, the TC server 200 can easily significantly degrade processing performance in a TC network environment, and, in particular, when high graphics/image processing is requested by TCs as in case of moving pictures.

SUMMARY OF THE INVENTION

The present invention provides an apparatus and method of allowing a thin-client (TC) server to process a graphic signal using hardware, instead of using software, in a TC environment, thereby increasing the performance of the TC server.

Further, the present invention provides an apparatus and method of receiving an image which has been processed by the TC server.

Additional aspects and advantages of the invention will be set forth in part in the description which follows and, in part, will be obvious from the description, or may be learned by practice of the invention.

The present invention can be achieved by a thin client/server network image processing system, comprising a communication network, a thin client system, and a server, which executes a predetermined application at the request of the thin client system according to a thin client/server network environment/architecture (thin server) and transmits the result of executing the application to the thin client system through the communication network. The server comprises a hardware image processor, which accelerates rendering of a graphic signal to be processed at the request of the thin client system and encodes the rendered graphic signal and a video signal linked to the graphic signal.

According to an aspect of the present invention, a thin client/server network image processing system, comprises a communication network, a thin client system, and a server which performs a predetermined application at the request of the thin client system according to a thin client/server network environment/architecture and transmits the result of performing the application to the thin client system through the communication network. The server comprises a hardware image processor, which accelerates rendering of a graphic signal to be processed at the request of the thin client system, encodes the rendered graphic signal and a video signal linked to the graphic signal, and transmits the encoded graphic and video signals to the thin client system according to a predetermined communication mode.

According to another aspect of the present invention, there is provided a method of operating a thin client/server network image processing system comprising a communication network, a thin client system, and a server which performs a predetermined application at the request of the thin client system according to a thin client/server network environment/architecture and transmits the result of performing the application to the thin client system through the communication network. The method comprises accelerating in the server rendering of a graphic signal to be processed at the request of the thin client system; encoding the rendered graphic signal and a video signal linked to the graphic signal; and transmitting the encoded graphic and video signals to the thin client system through the server and the communication network.

According to an aspect of the present invention, a method of operating a thin client/server network image processing system, comprises a communication network, a thin client system, and a server, which executes a predetermined application at the request of the thin client system according to a thin client/server network environment/architecture and transmits the result of executing the application to the thin client system through the communication network. The method comprises accelerating in the server rendering of a graphic signal to be processed at the request of the thin client system; encoding the rendered graphic signal and a video signal linked to the graphic signal; and transmitting the encoded graphic and video signals to the thin client system through the server according to a predetermined communication mode.

According to another aspect of the present invention, there is provided a thin client system receiving an image signal transmitted from a thin server through a communication network. The thin client system comprises a communication network controller controlling the communication network to receive encoded graphic and video signals, which are provided from the thin server through a predetermined communication mode; a decryptor (decoder) decrypting the encoded graphic and video signals in real time; and an image processor accelerating rendering of the decrypted graphic signal and/or performing a series of video processes, such as decoding, scaling, filtering, and color coordinate transformation, on the decrypted video signal and mixing the graphic and video signals to output a signal suitable for display.

According to another aspect of the present invention, there is also provided a method of receiving in a thin client an image signal transmitted from a thin server through a communication network. The method comprises controlling a predetermined communication mode to receive encoded graphic and video signals, which are provided from the thin server through the communication network; decrypting the encoded graphic and video signals in real time; accelerating rendering of the decrypted graphic signal and/or performing a series of video processes, such as decoding, scaling, filtering, and color coordinate transformation, on the decrypted video signal and mixing the graphic and video signals; and displaying the mixed graphic and video signals.

BRIEF DESCRIPTION OF THE DRAWINGS

The above and other advantages of the present invention will become more apparent by describing in detail preferred embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
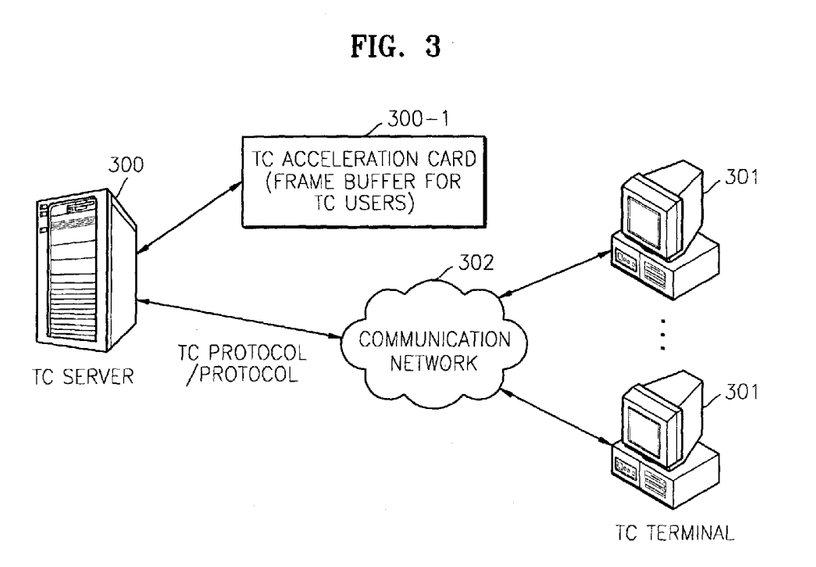
FIG. 3 is a block diagram of a client/server network system processing an image according to a TC environment according to a first embodiment of the present invention.
Figure 4:
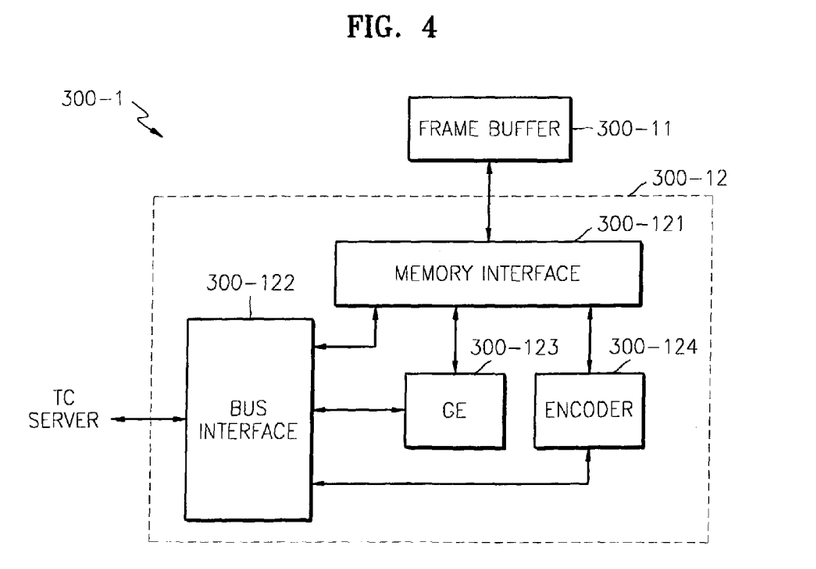
FIG. 4 is a block diagram of a TC acceleration card shown in FIG. 3.

Referring to FIG. 3, a network system processing an image in a thin-client (TC) environment according to a first embodiment of the present invention comprises a TC server 300, a TC acceleration card 300-1 provided within the TC server 300, a TC terminal 301 referred to as a thin client system, and a communication network 302. Referring to FIG. 4, the TC acceleration card 300-1 shown in FIG. 3 comprises a frame buffer 300-11 and an image processor 300-12. The image processor 300-12 comprises a memory interface 300-121, a bus interface 300-122, a graphic engine (GE) 300-123, and an encoder 300-124.

Figure 7:
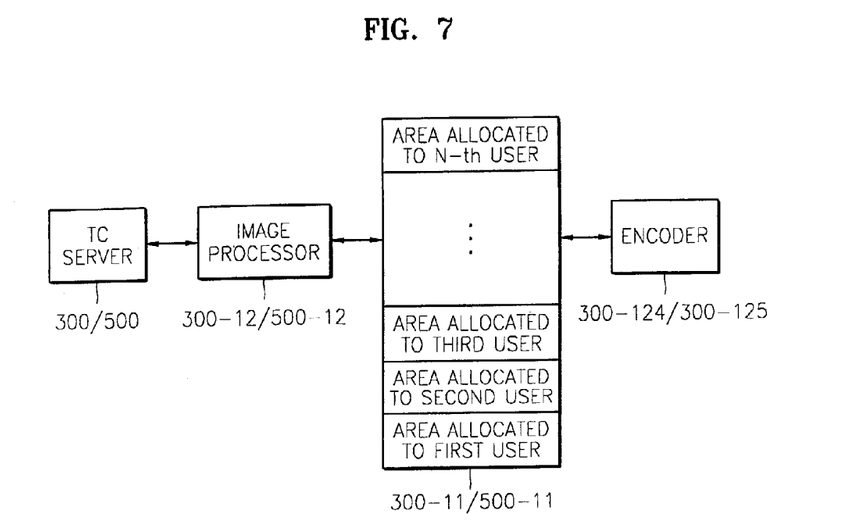
FIG. 7 is a block diagram of a frame buffer shown in FIGS. 4 and 6.

FIG. 7 is a block diagram of the frame buffer 300-11 shown in FIG. 4. Hereinafter, a network computer system and method of processing an image according to a TC environment according to the first embodiment will be described in detail with reference to FIGS. 3, 4, and 7. Although, the conventional TC server 100 or 200 in FIGS. 1 and 2 has high performance, when using only software for graphic/image processing to provide graphic/image signals to the thin clients 301, it can be weighted down (i.e., slowed down) by a large amount of graphic signals that are to be processed to, for example, reproduce a moving picture or execute a game program. Accordingly, the TC server 100 or 200 is limited in providing services for a large number of users.

However, the TC server 300 of the first embodiment of the present invention processes a graphic signal using hardware. For the hardware process, the TC server 300 includes the TC acceleration card 300-1. The TC acceleration card 300-1, which comprises the image processor 300-12 and frame buffer 300-11, accelerates the rendering of a graphic signal and encodes the rendered graphic signal and a video signal linked to the graphic signal.

In FIG. 4, the frame buffer 300-11 stores and outputs the graphic and video signals to be displayed on the TC terminal 301 through the memory interface 300-121. The GE 300-123, which is an acceleration processor, accelerates the following graphic processes of: drawing of a dot, line, quadrilateral, and polygon; graphic signal rendering, such as a bit block transfer (BitBlt); and/or motion compensation (MC) and inverse discrete cosine transform (IDCT) for encoding and/or decoding a moving picture in real time. To process a three-dimensional graphic signal, the GE 300-123 provides different types of rendering, such as texture mapping for realistic pictures, Gouraud shading for smoothly blended surfaces, depth-cue rendering for processing hidden lines of surfaces, fog rendering or alpha blending for adding special effects to a picture, anti-aliasing for improving the quality of a picture, masking for cutting a particular element off a picture, dithering for providing high picture quality using a small capacity of the frame buffer 300-11, and a logical operation for easily drawing or erasing particular objects on a screen.

The encoder 300-124 encodes a frame signal (actually a signal for a changed portion of a frame not an entire frame) to be transmitted to each TC terminal 301 according to a protocol of the TC terminal 301 and stores the encoded frame signal in either the frame buffer 300-11 through the memory interface 300-121 or a system memory (not shown) within the TC server 300 through the bus interface 300-122.

While a conventional frame buffer supports only a single local user, in the present invention, the frame buffer 300-11 provided in the TC acceleration card 300-1 divides an available space into a plurality of areas for a plurality of users. Typically, the number of users supported by the TC acceleration card 300-1 can vary with the size of the frame buffer 300-11. When the entire space of the frame buffer 300-11, which is provided for users, is full, the system memory within the TC server 300 can be used as the frame buffer 300-11. Since the operating system of the TC server 300 can use a time-division mode, even if many users use the TC server 300 simultaneously, it is only a single user that uses the TC server 300 at a particular time instant "t." Accordingly, an independent area in the frame buffer 300-11 is allocated to each user. The TC server 300 transmits an identification (ID) of a user currently accessing the frame buffer 300-11 to the TC acceleration card 300-1. Then, the TC acceleration card 300-1 stores the accelerated graphic signal in an area of the frame buffer 300-11, which is allocated to the user, referring to the user's ID.

Since the first embodiment TC acceleration card 300-1 does not provide a communication network controller, which controls a signal processed by the TC acceleration card 300-1 to be directly transmitted to the communication network 302, the TC server 300 receives the signal processed by the TC acceleration card 300-1 and via another communication network controller (not shown) in communication with the TC server, transmits the processed signal, to a TC terminal 301, which is connected to the TC server 300, through the communication network 302.

Figure 5:
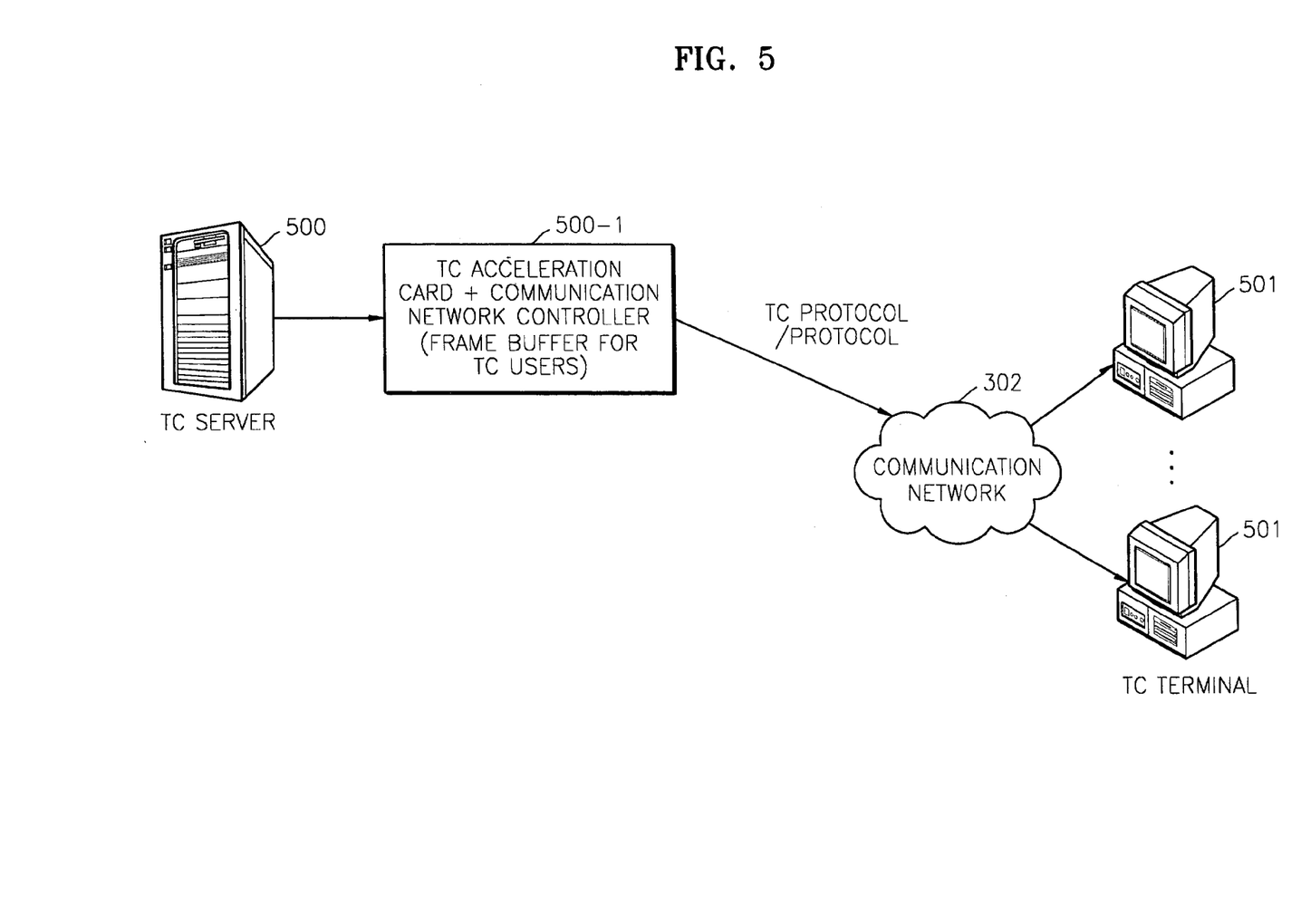
FIG. 5 is a block diagram of a client/server network system processing an image according to a TC environment according to a second embodiment of the present invention.
Figure 6:
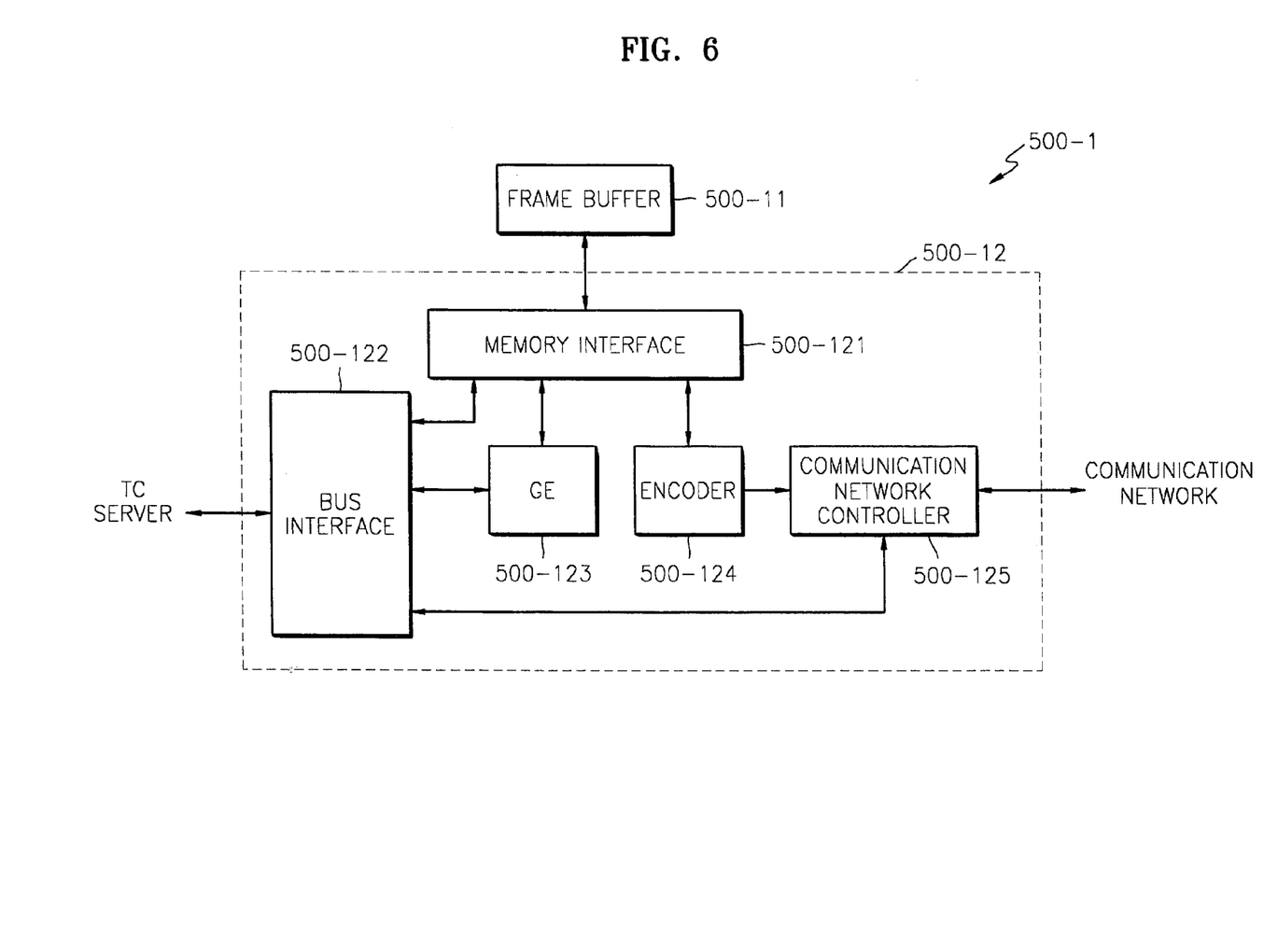
FIG. 6 is a block diagram of a TC acceleration card shown in FIG. 5.

FIG. 5 is a block diagram of a client/server network system processing an image according to a TC environment according to a second embodiment of the present invention. The system of the second embodiment comprises a TC server 500 having a TC acceleration card 500-1 with an integrated communication network controller, a TC terminal 501 referred to as a thin client system, and a communication network 502. Referring to FIG. 6, the TC acceleration card 500-1 shown in FIG. 5 comprises a frame buffer 500-11 and an image processor 500-12. The image processor 500-12 comprises a memory interface 500-121, a bus interface 500-122, a GE 500-123, an encoder 500-124, and a communication network controller 500-125.

FIG. 7 is block diagram of the frame buffer 500-11 shown in FIG. 6. Hereinafter, a network computer system processing an image according to a TC environment according to the second embodiment will be described in detail with reference to FIGS. 5 through 7. The TC server 500 of the second embodiment of the present invention processes a graphic signal using hardware. For the hardware process, the TC server 500 comprises the TC acceleration card 500-1 having the communication network controller 500-125. The TC acceleration card 500-1 having the communication network controller 500-125 accelerates rendering of a graphic signal, encodes the rendered graphic signal and a video signal linked to the graphic signal, and transmits the encoded graphic and video signals to a TC terminal 501 according to a mode of communication, for example, wire Internet communication or wireless Internet communication.

In FIG. 6, the frame buffer 500-11 stores and outputs the graphic and video signals to be displayed on the TC terminal 501 through the memory interface 500-121. The GE 500-123, which is an acceleration processor, accelerates drawing of a dot, line, quadrilateral, and polygon; graphic signal rendering, such as a bit block transfer (BitBlt); and/or motion compensation (MC) and inverse discrete cosine transform (IDCT) for encoding and/or decoding a moving picture in real time. To process a three-dimensional graphic signal, the GE 500-123 provides different types of rendering, such as texture mapping for realistic pictures, Gouraud shading for smoothly blended surfaces, depth-cue rendering for processing hidden lines of surfaces, fog rendering or alpha blending for adding special effects to a picture, anti-aliasing for improving the quality of a picture, masking for cutting a particular element off a picture, dithering for providing high picture quality using a small capacity of the frame buffer 500-11, and a logical operation for easily drawing or erasing particular objects on a screen.

The encoder 500-124 encodes a frame signal (actually a signal for a changed portion of a frame not an entire frame) to be transmitted to each TC terminal 501 according to a protocol of the TC terminal 501 and stores the encoded frame signal in the frame buffer 500-11 through the memory interface 500-121 or transmits the encoded frame signal to the communication network controller 500-125. The communication network controller 500-125 controls a communication mode to directly transmit the encoded graphic and video signals to the TC terminal 501 through the communication network 502.

While a conventional frame buffer supports only a single local user, in the present invention, the frame buffer 500-11 provided in the TC acceleration card 500-1 having the communication network controller 500-125 divides an available space into a plurality of areas for a plurality of users. Typically, the number of users supported by the TC acceleration card 500-1 having the communication network controller 500-125 can vary with the size of the frame buffer 500-11. When the entire space of the frame buffer 500-11, which is provided for users, is full, a system memory within the TC server 500 can be used as the frame buffer 500-11. Since the operating system of the TC server 500 can use a time-division mode, even if many users use the TC server 500 simultaneously, it is only a single user that uses the TC server 500 at a particular time instant "t." Accordingly, an independent area in the frame buffer 500-11 is allocated to each user. The TC server 500 transmits an identification (ID) of a user currently accessing the frame buffer 500-11 to the TC acceleration card 500-1 having the communication network controller 500-125. Then, the TC acceleration card 500-1 stores the accelerated graphic signal in an area of the frame buffer 500-11, which is allocated to the user, referring to the user's ID.

Since the second embodiment TC acceleration card 500-1 comprises the communication network controller 500-125, which controls a signal processed by the TC acceleration card 500-1 to be directly transmitted to the communication network 502, the graphic and video signals output to the communication network controller 500-125 are directly transmitted to a TC terminal 501, which is connected to the TC server 500, through the communication network 502. This is in contrast to the operation of the first embodiment (TC acceleration card 300-1 in FIG. 4) in which the TC server 300 receives the signal processed by the TC acceleration card 300-1 and, via another communication controller, transmits the processed signal to a currently connected TC terminal 301 through the communication network 302.

Figure 8:
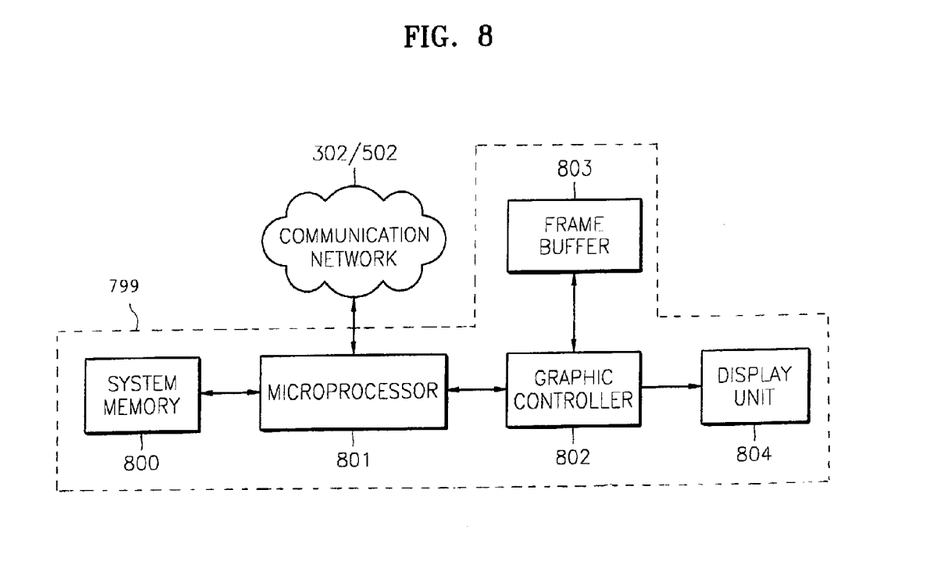
FIG. 8 is a block diagram of a thin client receiving an image processed by the TC servers shown in FIGS. 3 and 5, according to an embodiment of the present invention.

FIG. 8 is a block diagram of a thin client 301 or 501 (TC terminal/computing device 799) receiving and processing an image processed by the TC server 300 or 500, according to an embodiment of the present invention. The TC terminal 799 comprises a system memory 800, a microprocessor 801, a graphic controller 802, a frame buffer 803, a display unit 804. The TC terminal 799 is in communication with the TC server 301 or 501 via the communication network 302 or 502, respectively.

A method of receiving an image in a TC environment according to an embodiment of the present invention, will be described in detail with reference to FIG. 8. The system memory 800 stores various kinds of data for operating the apparatus 799. The microprocessor 801 controls the communication network 302/502 to receive an image signal through the communication network 302/502 and decompresses the image signal received through the communication network 302/502 in real time. In addition, the microprocessor 801 controls the apparatus 799 to access the communication network 302/502 even if the apparatus 799 is not connected to a server. The graphic controller 802 performs graphic acceleration on a received graphic signal, which is not processed in a transmitted image signal, and performs scaling, filtering, and color coordinate transformation on a video signal, which is not processed in the transmitted image signal. Then, the graphic controller 802 mixes the processed graphic signal and the processed video signal from the transmitted image signal and outputs the result to the display unit 804. The frame buffer 803 stores and outputs the processed graphic and video signals. Because the conventional computer 100 may not perform various services, for example, by not being equipped or have adequate processing capacity, a conventional TC terminal 203 can perform such various services by relying on the conventional TC server 100 or 200 having a large computational load, for example, to process large amounts of graphic signals in response to the TC terminals 203. However, in case of processing large amounts of graphic signals, even the conventional TC server 100 or 200 can be overly burdened (i.e., increase processing load leading to overloading) by the conventional TC terminals 203, because the TC server 100 or 200 renders a graphic signal using software in response to the conventional TCs 203. Accordingly, the present invention provides the TC server 300 or 500 and the TC terminal 799, which allow a large number of the TC terminals 799 connect to the TC server 300 or 500 to perform various services without overly burdening the TC server 300 or 500, because the TC server 300 or 500 are not overly/unnecessarily burdened by software processing the large amounts of graphic signals for the TC terminals 799. In particular, the TC server 300 or 500 processes a graphic signal after being rendered using hardware (i.e., the TC server 300 or 500 has a hardware graphics processor in response to the TC terminals 799). Further, in the TC terminal 799, the graphic controller 802 controls the display unit 804 to display based upon hardware processed graphic signals from the TC server 300 or 500.

As described above, the present invention processes a graphic signal using hardware instead of using software in a TC server, thereby minimizing a load on the TC server. Accordingly, a moving picture can be reproduced efficiently in a TC environment, and fast graphic processing can be achieved. More particularly, the present invention provides a thin server graphics/video/multimedia accelerator, comprising an image processor rendering image signals (for example, graphic signals, video signals, and/or encoded graphic and video signals) requested by at least one thin client; a frame buffer storing the rendered image signals; and a transmitter transmitting the rendered image signals to the thin client. The frame buffer comprises memory areas allocated to each thin client and the transmitter transmits the stored rendered image signals to the thin clients from the memory area allocated to each thin client.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A thin client/server network image processing system, comprising:
   a plurality of thin clients; and
   a server executing respective applications in response to respective requests of respective thin clients and transmitting respective results of executing the respective applications to the respective requesting thin clients through a network, the server including a hardware acceleration card which:
      accelerates rendering of respective graphic signals to be further processed at the request of the respective thin clients,
      encodes the rendered graphic signal and a video signal linked to the graphic signal for each respective thin client, and
      provides the respective encoded graphic signals and corresponding linked respective video signals to the server for transmission to the respective requesting thin clients,
   wherein,
   the hardware acceleration card comprises:
      a memory including a plurality of predetermined areas, each predetermined area independently allocated to one of the respective requesting thin clients, storing the respective rendered graphic signal and the video signal linked to the rendered graphic signal for the one respective thin client, and outputting the respective graphic and video signals, and
      an encoder which encodes the graphic and video signals output from the memory, and
   the encoder encodes a changed part of each rendered graphic and video signal based upon comparing the output graphic and video signals with previous graphic and video signals.

2. The image processing system of claim 1, wherein a number of the requesting thin clients varies with a size of the memory.

3. The image processing system of claim 2, wherein when all of the predetermined areas in the memory are allocated to the thin clients, a system memory within the server is divided into areas, which are allocated to thin clients that are not allocated areas of the memory in the hardware acceleration card.

4. A method of operating a thin client server which communicates with a plurality of thin clients through a network, the thin client server having a hardware acceleration card which accelerates rendering of a graphic signal, the method comprising:

allocating an independent portion of a memory in the hardware acceleration card to each of the plurality of thin clients communicating with the thin client server;

accelerating rendering of a graphic signal to be processed at the request of one of the thin clients;

encoding the rendered graphic signal and a video signal linked to the graphic signal;

storing the rendered graphic signal and the encoded graphic and video signals in the independent portion of the memory in the hardware acceleration card allocated to the requesting thin client; and     transmitting the encoded graphic and video signals to the requesting thin client,     wherein the encoding comprises:

encoding a changed part of the rendered graphic signal based upon comparing the rendered graphic signal with a previous graphic signal; and         encoding a changed part of the linked video signal based upon comparing the linked video signal with a previous video signal.

5. A thin client/server image processing network system, comprising:

a plurality of thin clients; and a thin client server executing respective applications in response to respective requests of respective thin clients system the thin client server including a hardware acceleration card which:

accelerates rendering of a graphic signal to be processed at the request of a respective thin client,         encodes the rendered graphic signal and a video signal linked to the graphic signal for each thin client, and         transmits the encoded graphic and video signals to the respective requesting thin client system according to a predetermined communication mode,     wherein,     the hardware acceleration card comprises:

a memory comprising a plurality of predetermined areas, each predetermined area independently allocated to one of the respective requesting thin clients, storing the respective rendered graphic signal and the video signal linked to the rendered graphic signal for the one respective thin client, and outputting the respective graphic and video signals;

an encoder which encodes the graphic and video signals output from the memory; and         a communication network controller which controls the communication mode to transmit the respective encoded graphic and video signals to the respective thin client systems,     a number of the requesting thin clients varies with a size of the memory, and     the encoder encodes a changed part of the rendered graphic signal based upon comparing the rendered graphic signal with a previous graphic signal and encodes a changed part of the linked video signal based upon comparing the linked video signal with a previous video signal.

6. The image processing system of claim 5, wherein the encoder encodes a changed part of the rendered graphic signal based upon comparing the rendered graphic signal with a previous graphic signal and encodes a changed part of the linked video signal based upon comparing the linked video signal with a previous video signal.

7. A thin server graphics accelerator card, comprising:

an image processor rendering image signals requested by a plurality of thin clients;

a frame buffer storing the rendered image signals, wherein the frame buffer comprises memory areas independently allocated to each requesting thin client;

a transmitter transmitting the rendered image signals to the thin client, wherein the transmitter transmits the stored rendered image signals to the thin clients from the memory area allocated to each thin; and     an encoder which encodes graphic and video signals output from the memory,     wherein the encoder encodes a changed part of each rendered graphic and video signal based upon comparing the output graphic and video signals with previous graphic and video signals.

* * * * *

UNITED STATES PATENT AND TRADEMARK OFFICE
CERTIFICATE OF CORRECTION

PATENT NO. : 7,075,544 B2 Page 1 of 1
APPLICATION NO. : 10/390761
DATED : July 11, 2006
INVENTOR(S) : Yong-jae Kim et al.

It is certified that error appears in the above-identified patent and that said Letters Patent is hereby corrected as shown below:

Column 10, Line 35, change "thin;" to --thin client;--.

Signed and Sealed this

Ninth Day of January, 2007

JON W. DUDAS
*Director of the United States Patent and Trademark Office*